(12) United States Patent
Dai et al.

(10) Patent No.: US 8,266,087 B2
(45) Date of Patent: Sep. 11, 2012

(54) CREATING FORMS WITH BUSINESS LOGIC

(75) Inventors: Zhou Lin Dai, Shanghai (CN); Gu Yi, Shanghai (CN); Shan Yi Ting, Shanghai (CN); Hao Zi, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 12/239,197

(22) Filed: Sep. 26, 2008

(65) Prior Publication Data

US 2010/0057648 A1    Mar. 4, 2010

(30) Foreign Application Priority Data

Sep. 27, 2007   (CN) .......................... 2007 1 0161997

(51) Int. Cl.
*G06F 17/00* (2006.01)
*G06N 5/02* (2006.01)

(52) U.S. Cl. ....................................................... 706/47
(58) Field of Classification Search ........................ None
See application file for complete search history.

(56) References Cited

U.S. PATENT DOCUMENTS

| | | | |
|---|---|---|---|
| 6,006,242 A * | 12/1999 | Poole et al. | 715/209 |
| 6,609,200 B2 * | 8/2003 | Anderson et al. | 713/176 |
| 2002/0083068 A1 * | 6/2002 | Quass et al. | 707/100 |
| 2004/0205525 A1 | 10/2004 | Murrey et al. | |

OTHER PUBLICATIONS

'Experiences in accuracy estimating electronic forms conversion services with a spiral estimate process'; Zhoulin, 2007, IEEE, 0-7695-2870.*

* cited by examiner

*Primary Examiner* — Kakali Chaki
*Assistant Examiner* — Peter Coughlan
(74) *Attorney, Agent, or Firm* — Cuenot, Forsythe & Kim, LLC (57) ABSTRACT

An eForm with integrated business logic is created from an existing eForm using a parser to parse a source eForm to extract attributes of items on the source eForm. An item recognition unit recognizes interactive items in the source eForm according to the attributes of the items extracted by the parser. A business logic recognition unit recognizes business logic integrated into the source eForm according to the attributes of the items. An object eForm generator generates an object eForm containing the recognized interactive items and business logic.

4 Claims, 9 Drawing Sheets

CREATING FORMS WITH BUSINESS LOGIC

BACKGROUND

This invention relates to processing of electronic forms (eForms) and particularly to creating eForms with business logic.

Forms are widely used in business, industry and government. Forms can be stored in various formats and usually can be printed on paper. However, with the development of electronic business practices, eForms have become popular. Consequently, there is an increasing demand for creating eForms by generating new eForms from the start and by revising existing eForms which may or may not conform to the same format as the desired eForm.

The smallest unit in an eForm is called an "Item", such as Label, Line, Field, Checkbox, Radio button, Date Picker, Pop List and so on. Attribute information on items, such as types, geometrical attributes (size and location etc.) and contents and/or logical attributes of items, are stored in an eForm file. Two of the most important characteristics of an item are visibility (whether an item can be electronically visualized to a user) and fillability (whether an item can be electronically filled in by a user). If an item can be filled in electronically by a user, it is called an interactive item. Otherwise, it is called an non-interactive item.

All eForms can be categorized into three types according to their interactive functionalities:
  (1) Non-interactive eForms have no interactive items. They look like their source paper forms. Users can read them on a display but can not fill them in electronically on a machine.
  (2) Basic-interactive eForms have the minimum interactive items that eForms could have, e.g., fields.
  (3) Advanced-interactive eForms have various interactive items. In addition to basic interactive items contain advanced interactive items. More importantly, advanced-interactive forms can recognize and apply business logic, as discussed below.

A file containing eForms is called an eForm file. Currently, eForm files exist in many formats, such as PDF, RTF, TEXT, HTML and so on. These formats may be incompatible with each other. When an eForm is converted from a source format to an target format, developers usually rely on an automatic tool, and then manually modify the converted eForm to satisfy clients' requirements.

Basic tools are available that convert an eForm into a target format that generates a displayed form apparently identical to the original form. However, the conversion process eliminates all of the interactive features that existed in the source documents.

Other tools available for converting existing eForms to new formats retain at least some basic interactive properties in the new eForms. The eForms created using such tools do not necessarily retain all of the interactive properties of the original eForms. When eForms are converted in batch, it takes considerable time for developers to manually recognize and convert the form items not appropriately converted by the conversion tool.

Additionally, eForms may integrate considerable business logic, such as verification for input of items, mathematical calculation and logic computation between items; and business flow relationship including mutual exclusion, joint operation and jump between items. Business logic information on eForms can be used in real-time processing of users' input, standardizing users' input and guiding users to fill in the forms more efficiently and correctly. In practice, business logic on eForms may be defined by programming, for example, in HTML language.

Before now, there has been no tool available for automatically recognizing business logic in source eForms during conversion of eForms. Existing conversion tools sometimes prevented business logic from being integrated into a converted form or corrupted the business logic integrated into the converted form. Manually reestablishing business logic in converted eForms is both inefficient and prone to the introduction of errors.

While the discussed problems are often worse when converting an eForm from one format to another, similar problems can also occur when generating a new eForm from a source eForm having the same format. In such a case there is still a need to recognize business logic in the source eForm and generate the new eForm with unimpaired business logic.

SUMMARY

The invention may be implemented as a device for creating an eForm with business logic. The device includes a parser for parsing a source eForm to extract attributes of items in the source eForm, an item recognition unit for recognizing interactive items in the source eForm according to attributes of the items extracted by the parser, a business logic recognition unit for recognizing business logic in the source eForm according to the attributes of the items, and an object eForm generator for generating an object eForm containing the recognized interactive items and business logic.

The invention may also be implemented as a method for creating eForms with integrated business logic. A source eForm is parsed to extract attributes of items on the source eForm. Interactive items in the source eForm are recognized according to the attributes of the items extracted in the parsing operation. Business logic in the source form is also recognized according to the attributes of the items. An object eForm is generating containing the recognized interactive items and business logic.

The invention may further be implemented as a computer program product comprising a computer usable medium embodying computer usable program code configured to parse a source eForm to extract attributes of items on the source eForm, recognize interactive items in the source eForm according to the attributes of the items extracted in the parsing operation, recognize business logic in the source eForm according to the attributes of the items; to generate an object eForm containing the recognized interactive items and business logic.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
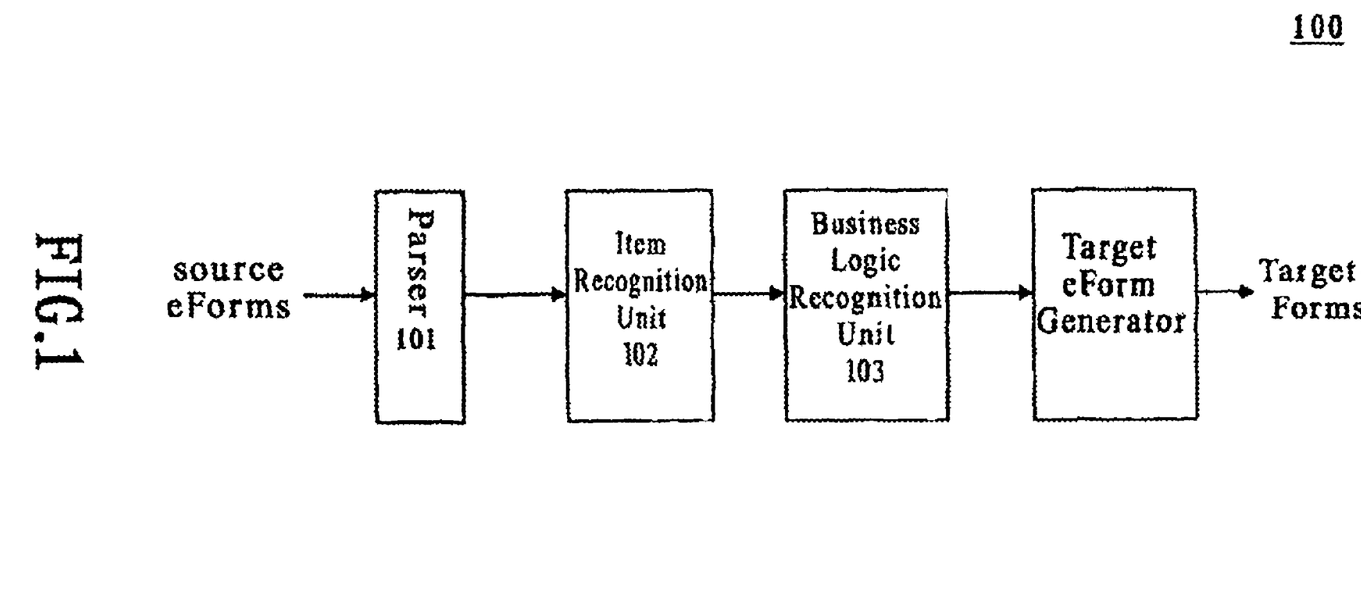
FIG. 1 is an overall block diagram of an eForm conversion device according to an embodiment of the invention.

FIG. 1 is an overall block diagram of an eForm conversion device 100 according to an embodiment of the invention. The eForm conversion device 100 comprises a parser 101, an item recognition unit 102, a business logic recognition unit 103 and an object eForm generator 104, which are serially concatenated.

Figure 2:
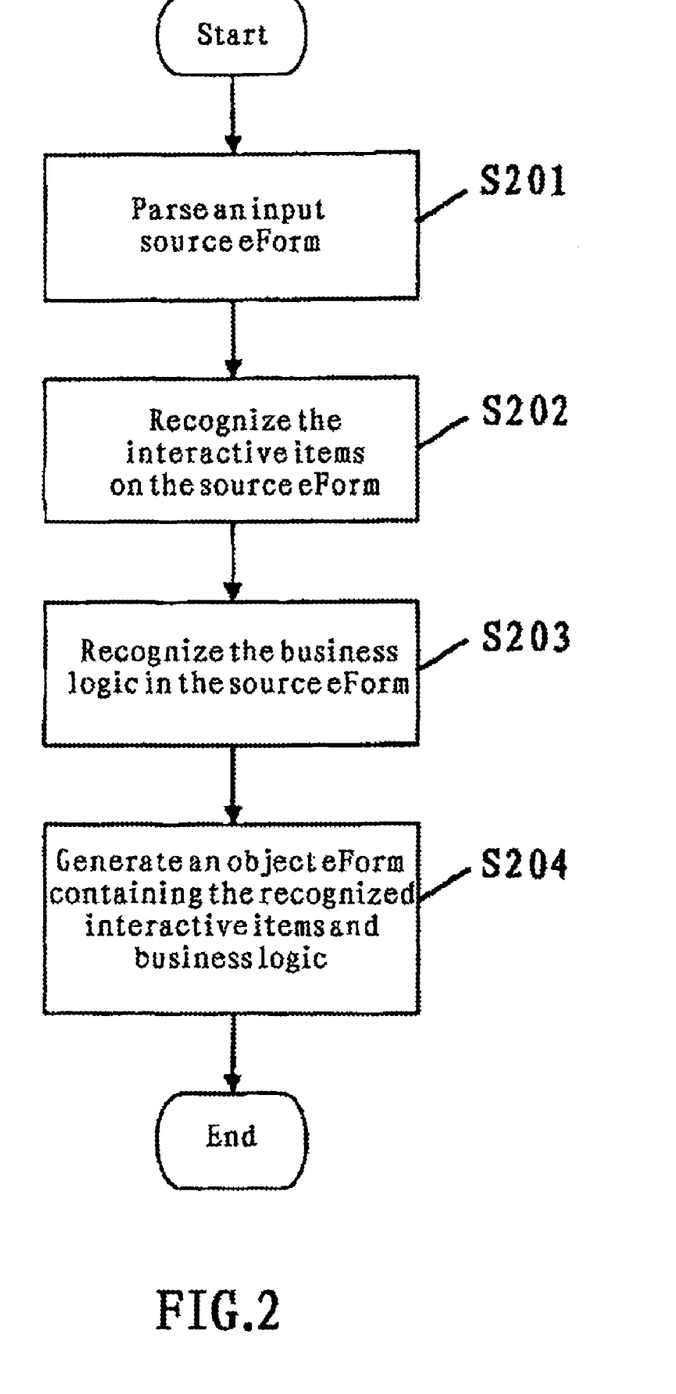
FIG. 2 is a work flow diagram of the eForm conversion device shown in FIG. 1.

FIG. 2 is a diagram which illustrates a workflow process of the eForm conversion device 100 shown in FIG. 1. In step S201, the parser 101 parses a source eForm in one of various formats. In step S202, the item recognition unit 102 recognizes recognizable interactive items in the source eForm. In step S203, the business logic recognition unit 103 recognizes implied business logic in the source eForm. In step S204, the object eForm generator 104 generates an object eForm containing the recognized interactive items and business logic.

Figure 3:
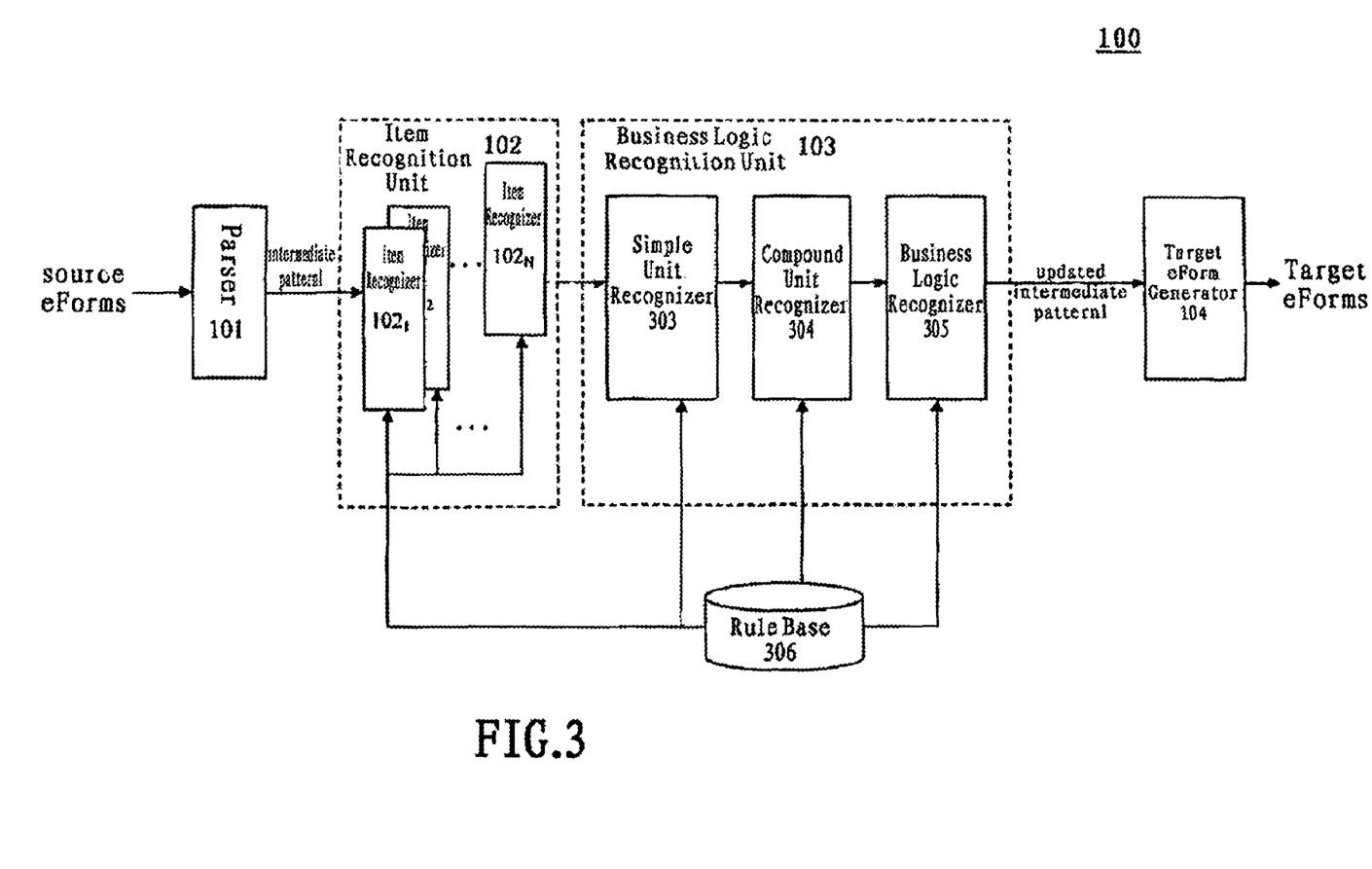
FIG. 3 is a structural block diagram which provides more detail about the eForm conversion device shown in FIG. 1.

FIG. 3 is a structural block diagram which illustrates in more detail the eForm conversion device 100 shown in FIG. 1, in which the like reference signs represent the like parts. As shown in FIG. 3, the eForm conversion device 100 comprises: the parser 101; the item recognition unit 102, which is composed of multiple serially-concatenated item recognizers $102_1$-$102_N$ (N is an integer greater than one); the business logic recognition unit 103, which is composed of a simple unit recognizer 303, a compound unit recognizer 304 and a business logic recognizer 305; the object eForm generator 104 and a rule base 306.

Figure 4:
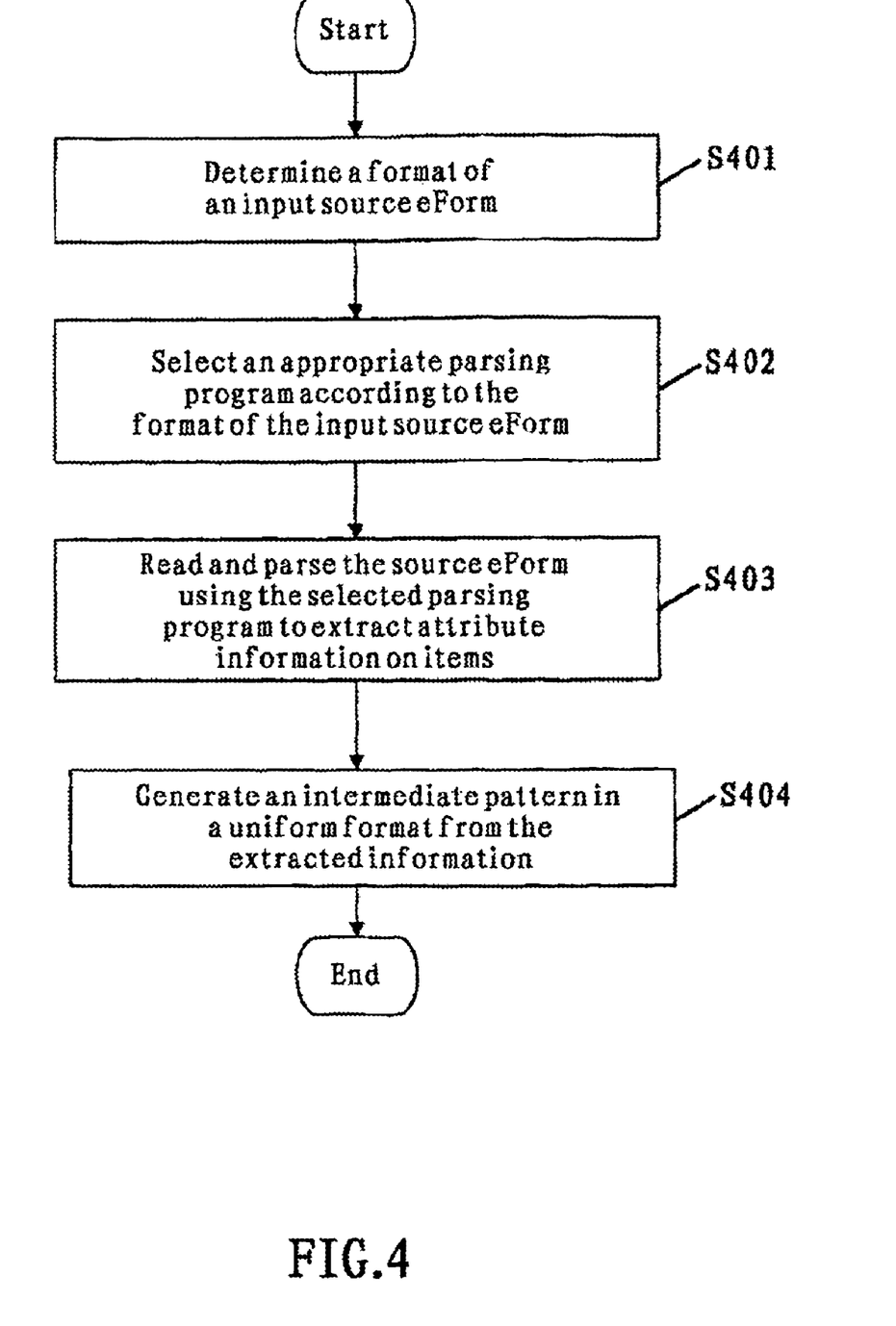
FIG. 4 is a work flow diagram for a parser shown in FIG. 3.

FIG. 4 illustrates a work flow diagram of the parser 101 shown in FIG. 3. A source eForm is input into the parser 101. The format of the source eForm may be PDF, RTF, HTML or the like. In step S401, the parser 101 automatically determines the format of the input source eForm. In step S402, the parser 101 selects an appropriate parsing program according to the determination in step S401. For example, a parsing program can be invoked automatically by the parser 101 according to the extension of the eForm file name, or alternatively be designated by the user. In step S403, the parser 101 reads and parses the input source eForm using the parsing program selected in step S402, so as to extract such attribute information as types, geometrical attributes and contents of all the items on the eForm. Here, the type represents such type information such as tags, fields, checkboxes or the like. Geometrical attributes include the length, width, height as well as location of the item on the eForm, represented by, for example, x and y coordinates. The contents may include text information. In step S404, the parser 101 generates an intermediate pattern in a uniform or standardized format from the information extracted in step S403. The types, geometrical attributes and contents of items on eForms in different formats may be defined and represented in different ways. How to extract such information is widely known to those skilled in the art. Such information is stored in the output intermediate pattern for access and use by the subsequent recognizers.

Figure 5:
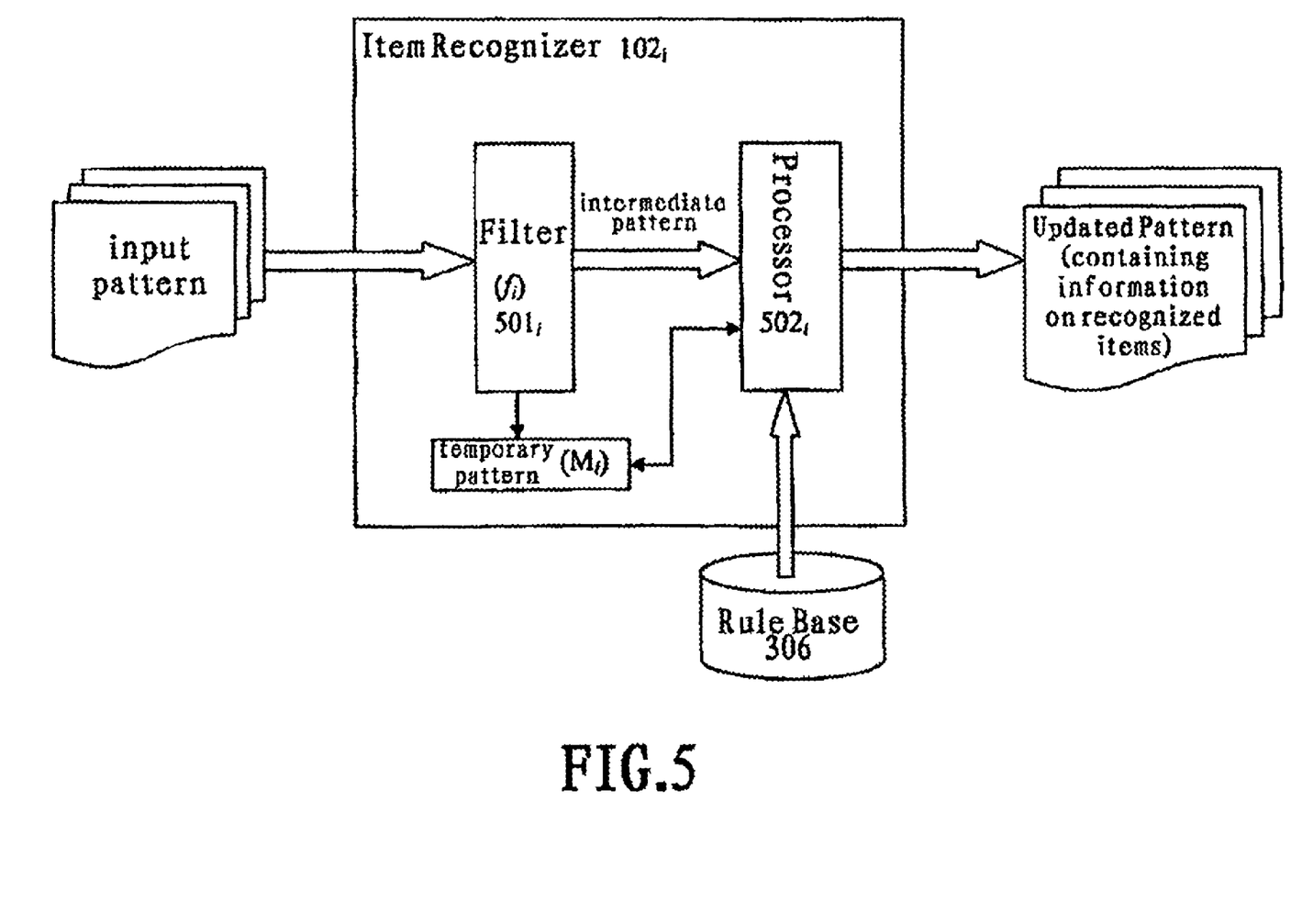
FIG. 5 is a structural block diagram of the item recognizer shown in FIG. 3.

The item recognition unit 102 is composed of multiple serially-concatenated item recognizers $102_1$-$102_N$, each of which can identify one or more specific kinds of items. FIG. 5 illustrates a structural block diagram of an item recognizer $102_i$. The item recognizer $102_i$ includes a filter $501_i$ and a processor $502_i$. The initial intermediate pattern that is output from the parser 101 is input into the item recognizer $102_1$, and the item recognizer $102_i$ ($1<i\leq N$) acquires the intermediate pattern output from the previous item recognizer $102_{i-1}$ as its own input.

The filter $501_i$ checks the types, geometrical attributes and other information on each item in the intermediate pattern, and stores the items which satisfy a filtering condition $f_1$ in a temporary pattern $M_i$. It is to be noted that the intermediate pattern is a full representation of the eForm being processed currently, but the temporary pattern is just a region or document for temporarily storing the items that need to be updated. For example, a filter of a LabelLine2Field recognizer passes items of Label type and Line type through and stores them in a temporary pattern. A filter of a Lines2Checkbox recognizer passes through the items that are of Line type and have a width or height smaller than a threshold value, and then stores them in a temporary pattern. The rule base 306 stores item recognition rules, each of which corresponds to a item recognizer $102_1$-$102_N$ and is defined with one or more "condition(s)" and corresponding "action(s)". After filtering, a processor $502_i$ will search the temporary pattern $M_i$ to detect the items matching the condition of the corresponding item recognition rule. If any items are identified, the processor $502_i$ will execute corresponding action(s). Two examples will be given in the following:

EXAMPLE 1

Rule for the LabelLine2Field Recognizer

| Condition | Action(s) |
|---|---|
| A single line is followed by a horizontal line; Width of the line is greater than 10 pixels; Thickness of the line is less than 3 pixels; Horizontal distance between the end of the tag and the starting point of the line is less than 10 pixels; Vertical distance between the bottom of the tag and the top of the line is less than 5 pixels; | Create a field and place it above the line; Set the width of the field equal to width of the line; Set the height of the field to a default value. |

If any tags or lines on the eForm satisfy all the conditions listed in the left column, a new interactive item "Field" will be created by executing the "Action(s)" listed in the right column.

EXAMPLE 2

Rules for Lines2Checkbox Recognizer

| Condition | Action(s) |
|---|---|
| 2 horizontal lines and 2 vertical lines; The width of the horizontal lines is approximately equal to the height of the vertical lines in value and both of them are less than 50 pixels; The x value of the starting point of the horizontal lines approximates the x value of the left vertical lines; The x value of the end of the horizontal lines approximates the x value of the right vertical lines; The y value of the starting point of the horizontal lines approximates the y value of the upper horizontal lines; The y value of the end of the vertical lines approximates the y value of the lower horizontal lines; | Create a Checkbox and place it at the location of the original line; Set the width of the Checkbox equal to that of the horizontal lines in value. Set the height of the Checkbox equal to that of the vertical lines in value. |

If any 4 lines on the eForm satisfy all the conditions listed in the left column, a new interactive item "Checkbox" will be created by executing the "Action(s)" listed in the right column.

The processor $502_i$ of each item recognizer $102_i$ is also responsible for updating the intermediate pattern. The intermediate pattern can be updated at different times. It can be updated immediately after new items are recognized by the corresponding item recognizer, or after one page or the whole eForm is recognized by the corresponding item recognizer. Alternatively, it is also possible to label all the items to be updated or transfer them to a temporary memory area, and then perform updating at one time after all the item recognizers have completed their operation.

Updating may be performed by modifying the codes of the items in the intermediate pattern so as to add, delete and/or modify the attributes of the items to be updated. For example, for items "Name: ________" on the source eForm, the LabelLine2Field recognizer will get a Label item "Name:" and a Line item "________". When it is verified that the two items satisfy an item recognition rule, a Field item with the predefined width and height will be created by executing the corresponding "Action". The Field item is then placed above the original Line item, but the Line item will not be deleted. For another example, when four short lines are identified by Lines2Checkbox recognizer to satisfy a condition of its rule, a new Checkbox will be created and be placed at the location of original lines, but in this case the four original lines can be either deleted or retained, depending on the definition of the action in the rule.

In this way, the original intermediate pattern becomes an updated intermediate pattern after being subject to recognition and processing by a series of different item recognizers $102_1$-$102_N$, where, all the recognizable items on the source eForm are recognized and turned into corresponding interactive items.

Figure 6:
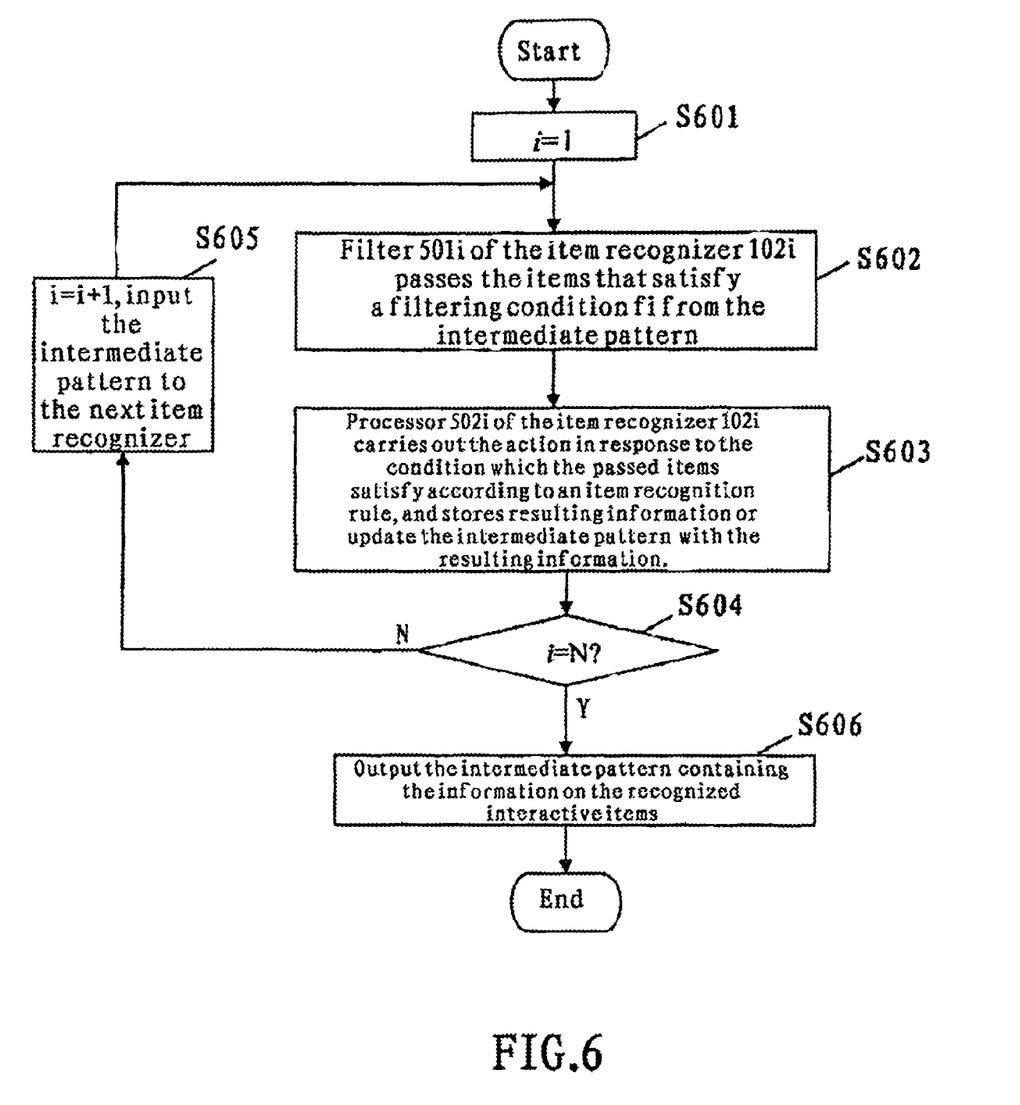
FIG. 6 is a flow diagram of the operation of the item recognition unit shown in FIG. 3.

FIG. 6 illustrates a flow diagram of the operation of the item recognition unit 102 according to one embodiment of the invention. In the step S601, let i=1. In step S602, the filter $501_i$ of the item recognizer $102_i$ passes the items that satisfy the filter condition f from the intermediate pattern i−1, and duplicates the passed items into a temporary pattern $M_i$. When i=1, it is the original intermediate pattern output by parser 101 that is input into the item recognizer $102_1$. In step S603, the processor $502_i$ of the item recognizer $102_i$ will check the passed items according to relevant rules. If any items are identified as satisfying the filtering condition, the processor $502_i$ will take a corresponding action and then update the intermediate pattern or record relevant information for further processing. In step S604, it is determined whether i is greater than N. If the determination shows "NO", the process will turn to the next step S605, and the variable i will be incremented by 1, and the intermediate pattern i will be input into the next item recognizer $102_{i+1}$. If the determination in step S604 shows "Yes", the procedure will turn to step S606, and the intermediate pattern containing all the recognized interactive items will be output in this step. Then the process ends When the process of item recognition is completed, a process of business logic recognition will begin. Business logic in eForms is the information which is applied to control the visibility and fillability of items according to the type, geometrical attributes and context, which refers to the contents of an item and its neighbor items. The process of recognizing business logic in eForms generally includes three steps: recognizing simple units, recognizing compound units and creating business logic.

In one embodiment of this invention, an eForm is divided into "sections" before the afore-mentioned three steps. A page in an eForm can be defined as a section initially. But it is sometimes unnecessary to scan the whole page every time the eForm is analyzed because it will slow down the process of recognition. To optimize the recognition of business logic and improve its efficiency, a page is divided into multiple sections according to section division rules. Section division rules can, for example, be defined as:

(1) A long line or a strip of colored area (vertical or horizontal) divides the initial section into 2.
(2) A non-table frame makes the area within it divided into an independent section;
(3) Areas of different background colors are divided into different sections;
(4) The start of a new section and the end of the previous section are indicated by character strings whose font is larger than the principal characters on the page.

The above-mentioned section division can be performed at different stages in FIG. 3. For instance, it can be performed by parser 101, or by a section division module (not shown) which could be inserted preceding the simple unit recognizer 303 in business logic recognition unit 103. It is to be understood that the above exemplified section division rules are just exemplary. In practice, a subset of these rules may be used or new rules may be added.

The operation of the simple unit recognizer 303 will be introduced below. A simple unit is combination of several items on the same page including at least one interactive item. If a simple unit includes more than one item, then these items should be close to one another in location. Definition of simple units is rule-based.

The intermediate pattern output from the item recognition unit 102 will be input into the simple unit recognizer 303. Analysis for each page of an eForm performed by the simple unit recognizer 303 is rule-based. Simple unit recognition rules in the rule base 306 are applied to parse eForms and detect the simple units matching corresponding simple unit recognition rules. The simple unit recognition rules define the situations in which two or more items can be grouped as a simple unit according to the types and geometrical attributes of the items. For example, it is required that the items in a simple unit should be close to one another in location. Examples will be given below.

(1) Recognition rules for Checkbox unit: a Checkbox unit consists of a Checkbox and tags adjoining the left/right/upper/lower parts of the Checkbox; there should be no other items between the Checkbox and the tags; the distance between the Checkbox and the tags should be less than 15 pixels.
(2) Recognition rules for input field unit: An input field unit consists of an input field and tags adjoining the left/right/upper/lower parts of the input field; tags are optional in this unit—that is, there may either be tags or no tags in the unit; between the input field and the tag there should be no other items but lines; the distance between the input field and the tag should be no more than 20 pixels.

Figure 7:
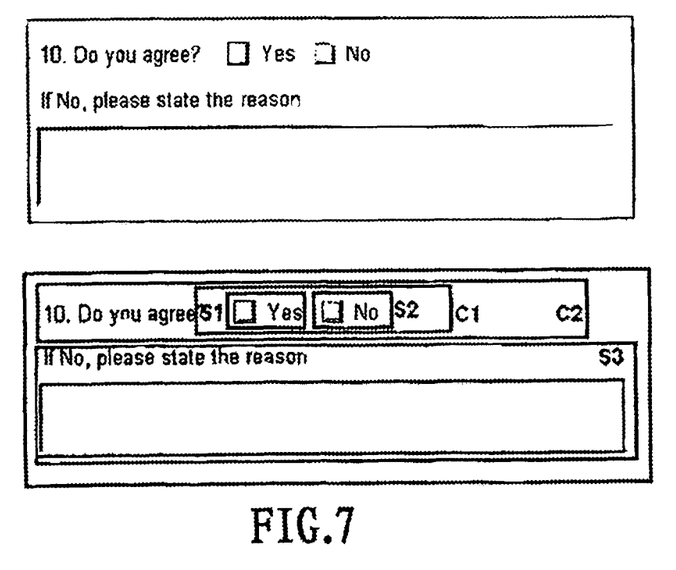
FIG. 7 illustrates part of an exemplary eForm.

In part of an eForm as shown in FIG. 7, a simple unit S1 consists of a tag "Yes" and a Checkbox on the left of this tag, simple unit S2 consists of a tag "No" and a Checkbox on the left of this tag, and simple unit S3 consists of a tag "If No, please state the reason" and an input field below this tag.

Then the compound unit recognizer 304 will analyze all the simple units to recognize compound units.

A compound unit may be composed of several simple units. The simple units in a compound unit can be location-related, item type-related, item contents-related and the combination of the above. Definition of compound units may also be rule-based. That is, the analysis performed by the compound unit recognizer 304 is rule-based. Compound unit recognition rules define the situations in which two or more simple or compound units can be grouped to form a compound unit on the basis of unit types and the relationship of unit locations. A compound unit may be composed of: two or more simple units; one or more simple units plus one or more compound units; or two or more compound units.

In an embodiment with section division according to this invention, some compound units can be preliminarily recognized in each section on the basis of the types and locations of the simple units. Then the compound unit recognizer 304 will scan all the simple units and all the recognized compound units in each section so as to detect new compound units. For instance:

(1) Recognition rules of checkbox group unit: A checkbox group unit is composed of two or more checkboxes and at least one descriptive tag; Checkbox group units in the checkbox group may be aligned vertically, horizontally or in a mixed way (e.g., 2 rows and 3 columns); the descriptive tags can be on the left side of all checkboxes; when the checkbox unit is within the table, between every two checkboxes there should be no other items but a line; two or more checkbox groups can be grouped into one greater checkbox group.

(2) Recognition rules for option button-field unit: Option button-field unit consists of an option button and an input field; two units should be aligned horizontally; the option button unit should be on the left side of the input field unit; there should be no other items between the option button unit and the input field unit; the distance between the option button unit and the input field unit should be no greater than 20 pixels.

In part of the eForm as shown in FIG. 7, the peripheral frame can form an enclosed section. Initially, a simple unit S1 and a simple unit S2 can be grouped to form a checkbox group compound unit C1. Then the compound unit recognizer 304 will further scan all the simple units S1-S3 and the recognized compound unit C1, and recognize a question-answer compound unit C2 which is composed of a tag "10. Do you agree?" and a compound unit C1.

After the compound units are recognized, they will be scanned by the business logic recognizer 305 so as to create business logic. In one embodiment of this invention, there are four types of business logic as follows:

(1) Input verification: To verify whether users' input conforms to a pre-defined syntax. If any error occurs, the user will be prohibited from inputting anything or will be asked to reenter the input. For example, if an input field begins with the symbol "Sum ($)", it means the content to be input should be numbers with two digits after a decimal point.

(2) Mathematical calculation: Mathematical calculation of multiple items, for example, summing operation for a column in a table.

(3) Logic computation: Logic computation of multiple items. Using setting the maximum length of an input field as an example, the height of the input field should be increased if the user has input too much content.

(4) Business flow: Simply speaking, business flow is the relationship between units, for example
  (i) Mutually exclusive relationship: If one or more items is enabled, one or more other items will be disabled;
  (ii) Mutually related relationship: If one or more items is enabled, one or more other items will be enabled;
  (iii) When the input to a unit exceeds a certain threshold, a section will be enabled.

In one embodiment of this invention, business logic is created based on the business logic recognition rules stored in the rule base 306. "Business logic pattern" and the corresponding actions are defined in business logic recognition rules. The business logic recognizer 305 takes the type, location and context of a unit (for a unit, its context includes the content of the unit itself and of its neighbor units) as its input, uses the pattern to verify conditions. If a matching pattern is found, corresponding business logic will be created on the basis of the mapping in the business logic recognition rules.

At first, the business logic recognizer 305 detects the business logic inside each compound unit. For example, a Checkbox group compound unit may have different business logics as follows:

(1) Mutually exclusive pattern: If the tags of each Checkbox within this group is literally mutually exclusive (for example, in the compound unit C1 in FIG. 3, S1 and S2 form a mutually exclusive pattern with their tags of "Yes" and "No"); or the title of this Checkbox group is literally mutually exclusive (for example, "Choose the best answer" or "Choose only one answer");

(2) A pattern where exactly N checkboxes are required to be chosen (for example, "Choose the best three answers");

(3) A pattern where all the checkboxes can be chosen at the same time (for example, "Choose all the proper answers").

Then, the business logic recognizer 305 detects the business logic among all the units inside each section. As there may exist compound units and independent simple units that have not been grouped into any compound units inside a section, business logic among units inside a section may include business logic between compound units, business logic between compound units and simple units, or business logic between simple units.

Taking FIG. 7 as an example, the business logic pattern between the checkbox group unit C1 and the input field unit S3 is: when the checkbox "No" is selected, the input field unit S3 is enabled and will become visible and fillable to users. The pattern in this example is "If No, then . . . ". A system without the function of business logic recognition can only recognize the simple units S1-S3, but cannot undertake real-time control over the visibility and fillability of the simple unit S3 according to the user's input into the units S1 and S2; in other words, it cannot instruct and direct users to fill in eForms. For example, if a user chooses the checkbox "Yes" of the unit S1, his further input into the field of the unit S3 is invalid, but an object eForm without business logic cannot prevent such behavior of the user.

Figure 8:
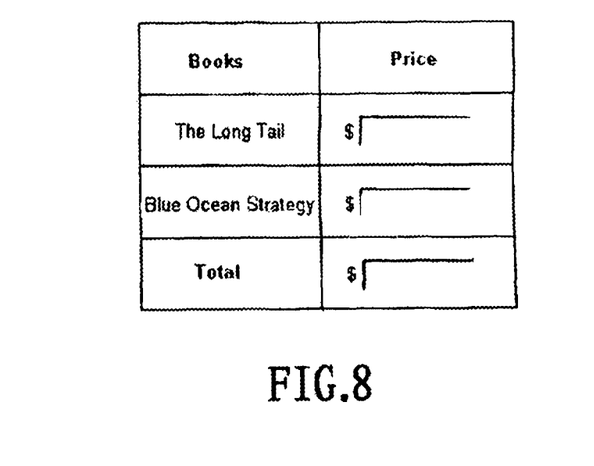
FIG. 8 illustrates part of another exemplary eForm.

FIG. 8 illustrates an example of business logic of mathematical calculation type. In this example, there are three input field units, each having a tag "$" and an input field. Business logic pattern among the three input fields is: when these units are placed on the same column "Price" and the last row on this column is labeled as "Total", the input field on the last row is the sum of all the other input field units on the column "Price". On condition that the eForm conversion device 100 has recognized the business logic and applied it to the object eForm, if the user fills in the input fields on the second and third rows, the eForm will automatically generate a sum value in the field on the row "Total". In a system without the function of business logic recognition, summing function is unavailable even if all the interactive input fields can be recognized. In addition, "Input Verification" logic can be recognized and added to this eForm. Due to the existence of the "$" tag, the eForm conversion device 100 recognizes, for example, the decimal numbers with two digits after the decimal point that should be input into the input field that follows, and have this business logic included in the object eForm. In this way, users can be guided to fill in the eForms and the input process will be standardized.

Figure 9:
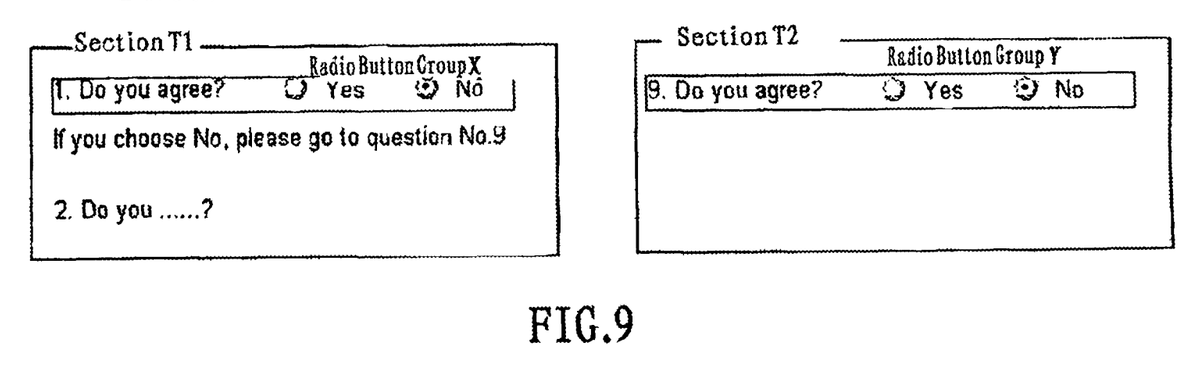
FIG. 9 illustrates part of still another exemplary eForm.

For compound units in different sections, the business logic across sections will be detected. FIG. 9 shows two sections T1 and T2 in a questionnaire. There is a Radio Button Group X in the section T1 and a Radio Button Group Y in the section T2. Business logic pattern therein could be: when the answer "No" is selected for the group X, all questions prior to the group Y will be disabled. In one example, the second to the eighth questions can all be set invisible and unfillable to users. In another example, they can be set visible, but in gray and unfillable. It can be seen that the pattern in this example is "If the answer to Question 1 is No, then jump to Question 9". Similarly, such business logic can also be used to direct users to fill in eForms.

When the business logic recognizer 305 recognizes specific business logic, it can execute the actions corresponding to the specific pattern on the basis of business logic recognition rules, for example, by modifying the codes of the intermediate pattern so as to add the information on the recognized business logic to the intermediate pattern.

Figure 10:
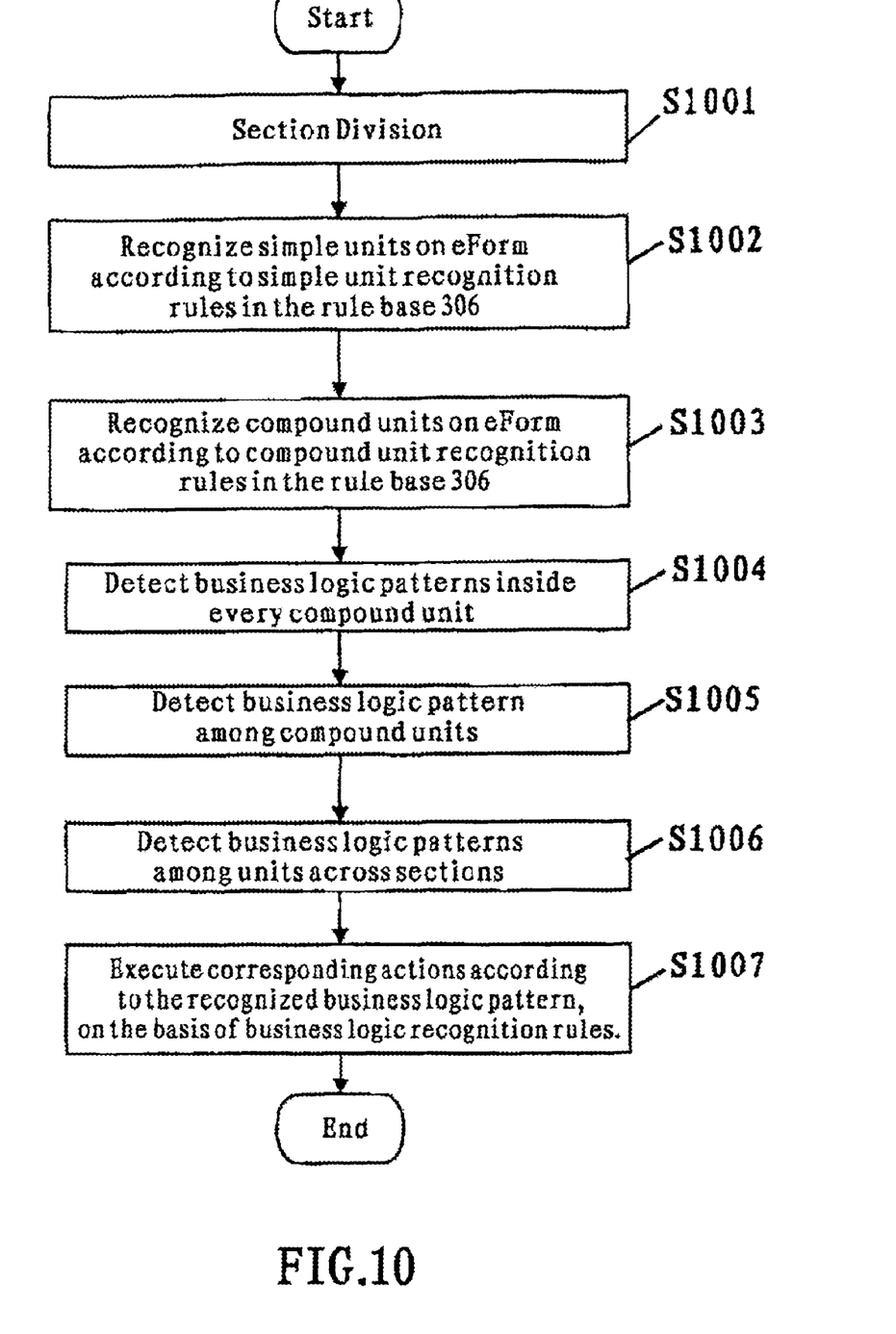
FIG. 10 is a flow diagram of the operation of the business logic recognition unit shown in FIG. 3.

FIG. 10 illustrates a flow diagram of the operation of the business logic recognition unit 104 according to one embodiment. Section division is performed in step S1001. In step S1002, simple units on the eForm are recognized according to the simple unit recognition rules in the rule base 306. In step S1003, compound units on the eForm are recognized according to the compound unit recognition rules in the rule base 306. In step S1004, the business logic pattern inside compound units is detected. In step S1005, the business logic pattern among the units in the same section is detected. In step S1006, the business logic pattern among the units across different sections is detected. In step S1007, on the basis of the business logic recognition rules in the rule base 306, the corresponding actions will be executed according to the recognized business logic pattern.

Alternatively, in another embodiment of this invention, simple units, compound units and business logic can be recognized on a page basis without section division. Of course, in this case, it is unnecessary to recognize the business logic across sections.

Generation of an object eForm will be described below. In the object eForm generator 104 of the eForm conversion device 100, the input intermediate pattern will be converted into the object eForm in a particular format. In the early processing, the recognized interactive item information and business logic information have already been incorporated in the intermediate pattern by, for example, modifying the codes of the intermediate pattern. As such, the object eForm generator 104 can extract such information and incorporate it into the resulting object eForm so as to form the object eForm with business logic.

Figure 11:
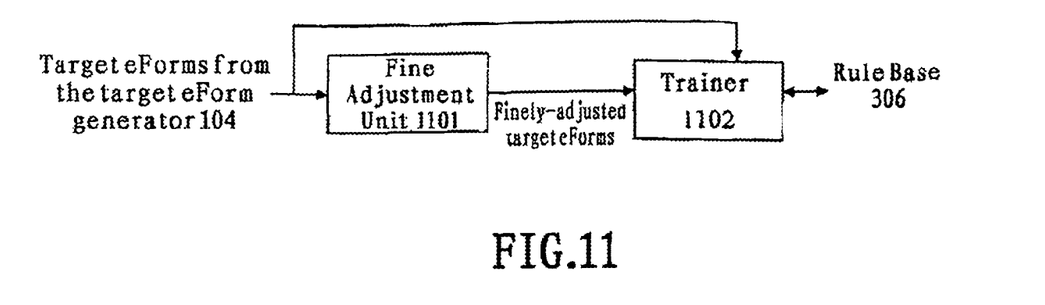
FIG. 11 illustrates structural diagrams of a fine adjustment unit and a trainer.

According to an embodiment of this invention, the eForm conversion device 100 may further comprise a fine adjustment unit 1101, as shown in FIG. 11. Users can check whether there are any interactive items and business logic that have not been recognized or have been wrongly recognized after the eForm conversion device 100 outputs the resulting object eForm containing interactive items and business logic. If there are, users can manually modify the things that haven't been recognized or have been wrongly recognized by means of the fine adjustment unit 1101. Fine adjustment may be frequently needed at the beginning of processing in batch because each eForm or each kind of forms may possess uncommon or unique items or business logic, for which no recognition rules are initially stored in the rule base 306 of the eForm conversion device 100 or there is difference between pre-defined rules and actual situations so that something is omitted or wrongly recognized in the object eForm. Operators' manual fine-adjustment can remedy the omission and/or correct the errors made by the eForm conversion device 100.

According to an embodiment of this invention, the eForm conversion device 100 may further include a trainer 1102 as shown in FIG. 11. The object eForm that is output from the object eForm generator 104 and the object eForm that has already been finely adjusted by the fine adjustment unit 1101 are input into the trainer 1102. The trainer 1102 compares the two eForms, learns users' fine-adjustment rules, and then modifies the rule base 306. This is a significant training process of the eForm conversion device 100, especially in batch processing. Through the processes of fine-adjustment and training with respect to a few eForms, the eForm conversion device 100 will be able to recognize all the interactive items and business logic according to users' requirements in later conversion processes. As such, work will be completed in less time and errors will be reduced as well. In an example, users can, through the user interface of the eForm conversion device 100, mark the relationship among the items, units and business logics in the object eForm that are output from the object eForm generator 104 and the corresponding items, units and business logics in the object eForm that have been finely adjusted by fine adjustment unit 1101, so as to enable the trainer 1102 to recognize the difference by comparing the eForms before and after conversion and learn the users' fine adjustment rules to complete the training process. In another example, users can also modify the rule base manually through programming to complete the training process. For example, the number of the pixels, as discussed above, can be modified by users.

In this invention, the rule base 306 can be created and updated in the following ways:

(1) The eForm conversion device 100 is built in, for example, in a hard disk, ROM or optical disk and so on, before shipment out of the factory. The rule base can be updated if desired by downloading the latest version via the Internet.

(2) Rules can be predefined by users. For instance, users can define rules through the user interface of the system or through programming.

(3) Rules can be created and modified during operation. Namely, the rule base 306 can be created and/or modified by users according to the actual conversion, or can be modified by the trainer 11102.

Figure 12:
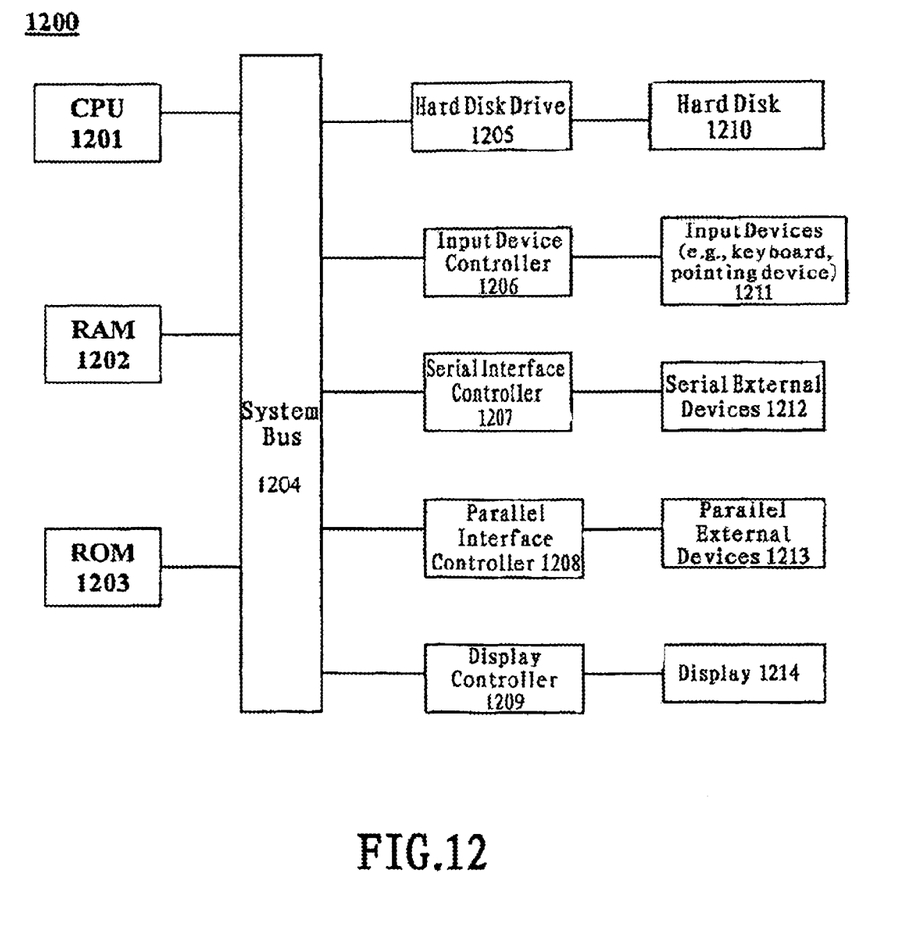
FIG. 12 illustrates a structural block diagram of a system in which the eForm automatic conversion device and method according to the invention may be implemented.

FIG. 12 illustrates a structural block diagram of a system in which the eForm automatic conversion device and method according to the invention may be implemented. CPU 1201, RAM 1202, and ROM 1203 are coupled to a system bus 1204. Hard disk 1210, input devices (e.g., keyboard and pointing device) 1211, serial external devices 1212, parallel external devices 1213, and a display 1214 are coupled to the system bus 1204 respectively via a hard disk controller 1205, an input device controller 1206, a serial interface controller 1207, a parallel interface controller 1208, and a display controller 1209.

This invention can be embodied as computer-readable instructions which are stored on RAM 1202, ROM 1203, Hard disk 1210 or external devices 1212 and 1213. CPU 1201 retrieves and executes these instructions via the system bus 1204 to carry out the present invention accordingly.

With the above description, it is recognized that the invention can not only recognize and convert interactive items on eForms, but also recognize the business logic integrated into eForms and implement the recognized business logic in the object eForms. As a result, real-time processing can be performed and users' input can be standardized when users are filling in an eForm. This invention can also direct users to fill in the forms more efficiently and correctly with the knowledge of the data that has already been input and further improve the eForm processing capacity of the background information processing system. With the eForm automatic conversion tool of this invention, workload of developers can be greatly reduced, and form conversion speed can be enormously increased especially in batch processing. In addition, it can reduce errors in manual operation and improve accuracy of operation.

Those skilled in the art will recognize that executing actions of the rules can be performed by modifying the codes of corresponding items on the eForm during the automatic conversion process of the device 100, for example, by adding, deleting and modifying one or more attributes of an item. These codes include information on the interactivity and business logic of items. When eForms are read and run by an application program, the application program will direct the user to fill in the eForm according to the interactivity, visibility and fillability of the code-controlled items. Of course, other methods can also be used as long as the object eForm contains the recognized interactive information and business logic.

As discussed above, the eForm conversion described in this specification includes the conversion between eForm files of the same format as well as of different formats. For instance, a source eForm in Lotus Form is input without any business logic, and a target eForm in Lotus Form with recognized business logic is desired. For this, it is only necessary to control the formatting in the object eForm generator 104.

With respect to the eForms for which interactive items have been recognized, the item recognition unit 102 can be omitted and the business logic recognition unit 103 is directly applied to recognize and apply the business logic.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A computing device for creating an eForm with business logic, comprising:
   a processor:
   a parser for parsing a source eForm to extract attributes of items on the source eForm;
   an item recognition unit for recognizing interactive items in the source eForm according to attributes of the items extracted by the parser;
   a business logic recognition unit for recognizing business logic in the source eForm according to the attributes of the items;
   an object eForm generator for generating an object eForm containing the recognized interactive items and business logic;
   a fine adjustment unit for modifying incorrectly recognized interactive items and business logic in the object eForm or adding omitted interactive items and business logic to the object; and
   a trainer which receives the object eForm generated by the object eForm generator and the finely-adjusted object eForm as inputs, compares the difference between the object eForm and the finely-adjusted object eForm at corresponding locations, and revises one or more of the item recognition rules, the simple unit recognition rules, the compound unit recognition rules and the business logic recognition rules as a function of the comparison, wherein
   the business logic recognition unit further comprises:
   a simple unit recognizer which groups the items into a plurality of simple units according to the attributes of the items on the basis of simple unit recognition rules;
   a compound unit recognizer which recognizes one or more compound units according to the types of the simple units and the location relationship among the simple units on the basis of compound unit recognition rules; and
   a business logic recognizer which detects business logic in the source eForm according to the types, locations and contents of the simple units and the compound units on the basis of business logic recognition rules,
   the item recognition unit further comprises a plurality of item recognizers, each of which recognizes one or more kinds of interactive items according to an associated item recognition rule.

2. The device of claim 1, where the parser divides each page of the source eForm into one or more sections on the basis of pre-defined section division rules, and the business logic recognition unit recognizes the business logic inside each section and across the sections.

3. A method for creating eForms with integrated business logic, comprising:
   parsing a source eForm to extract attributes of items on the source eForm;
   recognizing interactive items in the source eForm according to the attributes of the items extracted in the parsing operation;
   recognizing business logic in the source eForm according to the attributes of the items; and
   generating an object eForm containing the recognized interactive items and business logic;
   performing a fine adjustment by modifying incorrectly recognized interactive items and business logic in the object eForm and adding omitted interactive items and business logic to the object eForm; and
   performing training using the object eForm generated by the object eForm generator and the finely-adjusted object eForm as inputs and comparing the difference between the object eForm and the finely-adjusted object eForm at corresponding locations, and revising one or more of the item recognition rules, the simple unit recognition rules, the compound unit recognition rules and the business logic recognition rules as a function of the comparison, wherein
   recognizing business logic in the source eForm according to the attributes of the items further comprises:
   grouping the items into a plurality of simple units according to the attributes of the items on the basis of simple unit recognition rules;

recognizing one or more compound units according to the types of the simple units and the location relationship among the simple units on the basis of compound unit recognition rules; and detecting business logic in the source eForm according to the types, locations and contents of the simple units and the compound units on the basis of business logic recognition rules, recognizing interactive items in the source eForm according to the attributes of the items extracted in the parsing operation is based on item recognition rules.

4. The method of claim 3, wherein parsing a source eForm to extract attributes of items on the source eForm further comprises:

dividing each page of the source eForm into one or more sections on the basis of pre-defined section division rules; and recognizing business logic in the source eForm according to the attributes of the items further comprises recognizing the business logic inside each section and across the sections.

* * * * *